US011577181B2

United States Patent
Laws (10) Patent No.: US 11,577,181 B2
(45) Date of Patent: Feb. 14, 2023

(54) FORWARD SECANT SWIRL TUBE

(71) Applicant: Reyco Systems, Inc., Caldwell, ID (US)

(72) Inventor: Andrew J. Laws, Boise, ID (US)

(73) Assignee: REYCO SYSTEMS, INC., Caldwell, ID (US)

( * ) Notice: Subject to any disclaimer, the term of this patent is extended or adjusted under 35 U.S.C. 154(b) by 0 days.

(21) Appl. No.: 17/510,155

(22) Filed: Oct. 25, 2021

(65) Prior Publication Data

US 2022/0040599 A1 Feb. 10, 2022

Related U.S. Application Data

(62) Division of application No. 16/689,917, filed on Nov. 20, 2019, now Pat. No. 11,173,421.

(51) Int. Cl.
| | | |
|---|---|---|
| *B01D 17/02* | (2006.01) | |
| *B04C 3/00* | (2006.01) | |
| *B04C 3/06* | (2006.01) | |
| *B01D 45/16* | (2006.01) | |
| *B04B 7/02* | (2006.01) | |

(52) U.S. Cl.
CPC ......... *B01D 17/0217* (2013.01); *B01D 45/16* (2013.01); *B04B 7/02* (2013.01); *B04C 3/00* (2013.01); *B04C 3/06* (2013.01); *B04C 2003/006* (2013.01)

(58) Field of Classification Search
CPC ...... B01D 17/0217; B01D 45/16; B04C 3/00; B04C 3/06; B04C 2003/006
See application file for complete search history.

(56) References Cited

U.S. PATENT DOCUMENTS

| | | | |
|---|---|---|---|
| 2,037,426 A | 4/1936 | McKeever | |
| 3,407,575 A | 10/1968 | Krizman | |
| 3,443,368 A | 5/1969 | Wilson et al. | |
| 3,543,485 A | 12/1970 | Hardison | |
| 3,724,181 A * | 4/1973 | Benson, Jr. ............ | B01D 45/16 55/459.3 |
| 3,813,854 A * | 6/1974 | Hortman ................... | B04C 3/00 55/447 |

(Continued)

OTHER PUBLICATIONS

Belmont et. al. 2017 "Accounting for water formation from hydrocarbon fuel combustion in life cycle analyses". Environ. Res. Lett. 12 094019 (Year: 2017).*

(Continued)

*Primary Examiner* — Liam Royce
(74) *Attorney, Agent, or Firm* — Parsons Behle & Latimer (57) ABSTRACT

A forward secant swirl tube may be used to separate heavier particles such as oil and moisture from an air flow. The swirl tube includes a central hub having a centerline and a circular perimeter. An outer circular housing extends from an inlet edge to an outlet edge. A plurality of vanes extends from the central hub to the outer housing. The vanes are equally spaced around the central hub. Each vane has an inlet transition portion connected to a discharge portion. The top edge of the inlet transition portion of each vane is offset from the centerline of the central hub forming a forward secant line with respect to the centerline of the central hub and a direction of spin induced by the plurality of vanes.

18 Claims, 9 Drawing Sheets

(56) References Cited

U.S. PATENT DOCUMENTS

| | | | |
|---|---|---|---|
| 3,885,934 A * | 5/1975 | Eads | B04C 3/00 |
| | | | 55/392 |
| 3,961,923 A | 6/1976 | Zia Rouhani | |
| 7,811,344 B1 * | 10/2010 | Duke | B01D 45/16 |
| | | | 55/346 |
| 2003/0000185 A1 | 1/2003 | Higashino et al. | |
| 2012/0000168 A1 | 1/2012 | Chaudhari et al. | |
| 2017/0319029 A1 | 11/2017 | Hyun et al. | |

OTHER PUBLICATIONS

International Searching Authority; International Search Report and Written Opinion for US Serial No. PCT/US2020/57494 dated Jan. 26, 2021 Jan. 26, 2021.

US Patent and Trademark Office; Office Action for U.S. Appl. No. 16/689,917 dated Aug. 17, 2021 Aug. 17, 2021.

US Patent and Trademark Office; Notice of Allowance and Fees Due for U.S. Appl. No. 16/689,917 dated Sep. 13, 2021 Sep. 13, 2021.

* cited by examiner

FORWARD SECANT SWIRL TUBE

RELATED APPLICATIONS

The present application is a divisional patent application of U.S. patent application Ser. No. 16/689,917 entitled Forward Secant Swirl Tube filed on Nov. 20, 2019, which is incorporated by reference herein in its entirety.

FIELD OF THE DISCLOSURE

The embodiments described herein relate to apparatuses, systems, and methods for a forward secant swirl tube.

BACKGROUND

Description of the Related Art

Swirl tubes, also referred to as inline non-reversing cyclones, typically include a plurality of vanes within a tube that are configured to cause the airflow through the tube to rotate or swirl. The design uses the principles of centripetal acceleration to arrange the particles by mass flow annularly for separation purposes. One of the obstacles for using a swirl tube is the cost of fabrication due to the geometry of the vanes at the inlet of the swirl tube. Recent advances in 3D printing has overcome some of the manufacturing issues. However, 3D printing is not applicable or cost effective for all industries, such as applications that involve high temperatures and/or sanitary applications. For example, in some food applications the swirl tube may be subjected to caustic solutions at near boiling temperatures, or hot cooking oil. Plastic 3D printed swirl tubes may not be suitable for such applications. High temperature applications typically require swirl tubes made out of metal, which may be cost prohibitive for 3D printing manufacturing.

Swirl tubes are generally preferred for their relative simplicity. Often the leading edge of the vanes within the swirl tube are aligned with the centerline of the central hub of the swirl tube. With certain fluid loading situations, a longer transition section is needed at the outside edge for a reduction in pressure drop. These swirl tubes are called backward secant swirl tubes as the leading edges of the vanes contact the inner and outer walls at a secant of each behind the normal tangent in reference to the direction of spin induced by the vanes. This geometry of backward secant swirl tubes poses an even larger headache for fabrication, due to an even more advanced geometry used in the transition section. Other disadvantages may exist.

SUMMARY

The present disclosure is directed to apparatus, systems, and methods for a swirl tube that overcomes at least one of the disadvantages discussed above. The present disclosure is directed to apparatuses, systems, and methods for a forward secant swirl tube.

An embodiment of the present disclosure is an apparatus comprising a central hub having a centerline and a circular perimeter. The apparatus includes an outer housing, the outer housing comprising a circular wall that extends from an inlet edge to an outlet edge. The apparatus includes a plurality of vanes that extend from the central hub to the outer housing, the plurality of vanes equally spaced around the circular perimeter of the central hub, each vane of the plurality of vanes having an inlet transition portion connected to a discharge portion, the inlet transition portion having a top edge and the discharge portion having a bottom edge. The top edge of the inlet transition portion of each vane of the plurality of vanes is offset from the centerline of the central hub and the top edge forms a forward secant line with respect to the centerline of the central hub and a direction of spin induced by the plurality of vanes.

The apparatus may include five vanes. The apparatus may include six vanes. The discharge portion of each vane of the plurality of vanes may have a constant incline along a line normal to the centerline of the central hub. The inlet transition portion of each vane of the plurality of vanes may include an upper portion, a middle portion, a lower portion, a first bend at a first interface between the upper portion and the middle portion, and a final bend at a second interface between the middle portion and the lower portion, wherein the lower portion of the inlet transition portion is connected to the discharge portion.

The upper portion, middle portion, and lower portion of each vane of the plurality of vanes may comprise a face. The face of the upper portion of the inlet transition portion of each vane of the plurality of vanes may be oriented at a first angle with respect to a plane along the outlet edge of the outer housing. The face of the middle portion of the inlet transition portion of each vane of the plurality of vanes may be oriented at a second angle with respect to the plane along the outlet edge of the outer housing. The face of the upper portion of the inlet transition portion of each vane of the plurality of vanes may be oriented at a final angle with respect to the plane along the outlet edge of the outer housing. The first angle may be greater than the second angle and the second angle may be greater than the final angle.

The apparatus may be comprised of stainless steel. A direction of flow through the plurality of vanes may be upwards with respect to gravity. The central hub may include a top surface. The top surface may include a first face, a second face, and an interface between the first face and the second face. The first face may extend downward toward the plurality of vanes from the interface and the second face may extend downward toward the plurality of vanes from the interface.

An embodiment of the present disclosure is a system comprising a flow tube having an outer housing, an inlet, and an outlet. The system includes an inner housing positioned within the outer housing of the flow tube. The system includes a collection housing having an inner chamber and at least one opening between the inner housing and the outer housing, the at least one opening in communication with the inner chamber of the collection housing. The system includes a swirl tube positioned between the inlet and the outlet of the flow tube, wherein fluid flowing through the inlet of the flow tube passes through the swirl tube.

The swirl tube comprises a central hub having a centerline and a circular perimeter. The swirl tube includes an outer housing, the outer housing comprising a circular wall that extends from an inlet edge to an outlet edge. The swirl tube includes a plurality of vanes that extend from the central hub to the outer housing, the plurality of vanes equally spaced around the circular perimeter of the central hub. Each vane of the plurality of vanes having an inlet transition portion connected to a discharge portion, the inlet transition portion having a top edge and the discharge portion having a bottom edge, wherein the top edge of the inlet transition portion of each vane of the plurality of vanes is offset from the centerline of the central hub and the top edge forms a forward secant line with respect to the centerline of the central hub and a direction of spin induced by the plurality of vanes. Wherein the swirl tube causes heavier particles of the fluid flowing through the swirl tube to flow into the inner chamber of the collection housing via the at least one opening and the remaining fluid flowing out the outlet of the flow tube.

The heavier particles may be at least one of moisture droplet, oil droplets, and vapor. The discharge portion of each vane of the plurality of vanes may have a constant incline along a line normal to the centerline of the central hub. The inlet transition portion of each vane of the plurality of vanes may comprise an upper portion, a middle portion, a lower portion, a first bend at a first interface between the upper portion and the middle portion, and a final bend at a second interface between the middle portion and the lower portion, wherein the lower portion of the inlet transition portion is connected to the discharge portion.

The upper portion, middle portion, and lower portion of each vane of the plurality of vanes may comprise a face. The face of the upper portion of the inlet transition portion of each vane of the plurality of vanes may be oriented at a first angle with respect to a plane along the outlet edge of the outer housing. The face of the middle portion of the inlet transition portion of each vane of the plurality of vanes may be oriented at a second angle with respect to the plane along the outlet edge of the outer housing. The face of the lower portion of the inlet transition portion of each vane of the plurality of vanes may be oriented at a final angle with respect to the plane along the outlet edge of the outer housing. The first angle may be greater than the second angle and the second angle may be greater than the final angle. The plurality of vanes may comprise five vanes and the outer housing may have an inner diameter of 12 inches. The plurality of vanes may comprise six vanes and the outer housing may have an inner diameter of 24 inches.

An embodiment of the present disclosure is a method that comprises providing a flow of fluid through a forward secant swirl tube. The method includes moving heavier particles within the flow toward an outer diameter of the forward secant swirl tube via centripetal acceleration. The method includes removing at least a portion of the heavier particles from the flow of fluid and discharging the flow of fluid from the forward secant swirl tube.

The heavier particles may be moisture particles and oil particles. The forward secant swirl tube may comprise a central hub having a centerline and a circular perimeter. The forward secant swirl tube may include an outer housing, the outer housing comprising a circular wall that extends from an inlet edge to an outlet edge. The forward secant swirl tube may include a plurality of vanes that extend from the central hub to the outer housing, the plurality of vanes equally spaced around the circular perimeter of the central hub, each vane of the plurality of vanes having an inlet transition portion connected to a discharge portion, the inlet transition portion having a top edge and the discharge portion having a bottom edge.

The top edge of the inlet transition portion of each vane of the plurality of vanes is offset from the centerline of the central hub and the top edge may form a forward secant line with respect to the centerline of the central hub and a direction of spin induced by the plurality of vanes. The inlet transition portion of each vane of the plurality of vanes may include a plurality of faces formed by a press brake.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

Figure 1:
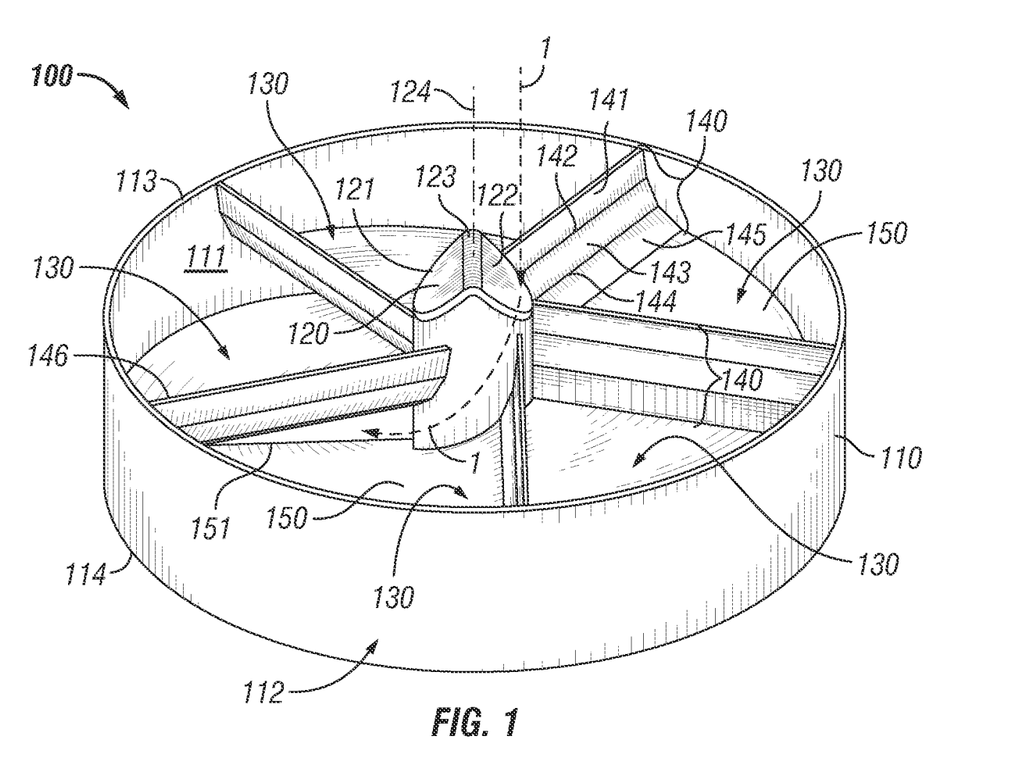
FIG. 1 shows a perspective view of an embodiment of a swirl tube.

FIG. 1 shows a perspective view of an embodiment of a swirl tube 100. The swirl tube 100 include a central hub 120, and outer housing 110, and five vanes 130 that extend between the central hub 120 and the outer housing 110. The outer housing 110 is a circular wall that extends from an inlet edge 113 to an outlet edge 114. The outer housing 110 has an inner surface 111 and an outer surface 112. The swirl tube 100 may have an inner diameter of twelve (12) inches. However, the inner diameter of the swirl tube 100 is not limited to twelve (12) inches and may be varied depending on the application. For example, in some applications the inner diameter may be thirty (30) inches.

The central hub 120 has a circular perimeter 125 (best shown in FIG. 2) with the vanes 130 equally spaced around the perimeter 125. The top portion of the central hub 120 includes a first face 121 and a second face 122 with a bend 123 between the first and second faces 121, 122. The purpose of the angled faces is to allow for drainage for sanitary purposes. The central hub 120 has a centerline 124. This centerline 124 is shared with the outer housing 110. The top portion of the central hub 120 is configured to be more aerodynamic that as flat faced top. The configuration of the top portion of the central hub 120 is shown for illustrative purposes and may be varied depending on the application as would be appreciated by one of ordinary skill in the art having the benefit of this disclosure.

The vanes 130 are configured to cause airflow through the vanes 130 to swirl allowing centripetal acceleration to remove heavier particles, such as water and oil droplets and/or vapor, from the air flow. The vane 130 includes inlet transition portion 140 connected to a discharge portion 150. The inlet transition portion 140 includes a top edge 146 of the vane 130 and the discharge portion 150 includes a bottom edge 151 of the vane 130. The top edge 146 of each vane 130 is offset from the centerline 124 of the central hub 120. Specifically, the vanes 130 are configured so that the top edge 146 forms a forward secant line with respect to the centerline 124 of the central hub 120 and a direction of spin (indicated by arrows 1) induced by the plurality of vanes 130.

The inlet portion 140 include an upper portion 141, a middle portion 143, a lower portion 145, a first bend 142 at a first interface between the upper portion 141 and the middle portion 143, and a final bend 144 at a second interface between the middle portion 143 and the lower portion 145 with the lower portion 145 of the inlet transition portion 140 being connected to the discharge portion 150. In one embodiment, the middle portion 143 may consist of multiple bends. Specifically, the upper portion 141, middle portion 143, and lower portion 145 of each vane 130 may comprise a face that extends from the central hub 120 to the outer housing 110. The face of the upper portion 141 of the inlet transition portion 140 of each vane is oriented at a first angle with respect to a plane along the outlet edge 114 of the outer housing 110. The face of the middle portion 143 of the inlet transition portion 140 of each vane is oriented at a second angle with respect to the plane along the outlet edge 114 of the outer housing 110. The face of the lower portion 145 of the inlet transition portion 140 of each vane is oriented at a final angle with respect to the plane along the outlet edge 114 of the outer housing 110. The first angle is greater than the second angle and the second angle is greater than the final angle. The inlet transition portion 140 allows the discharge portion 150 of the vanes 130 to have a constant incline or straight section. The geometry of the discharge portion 150 may be formed by simply stamping sheet metal using an auger flight press. The different portions 141, 143, 145 of the inlet transition portion 140 may be formed with a press brake. These portions could take on a different number and angles may be varied depending on the application as would be appreciated by one of ordinary skill in the art having the benefit of this disclosure.

Figure 2:
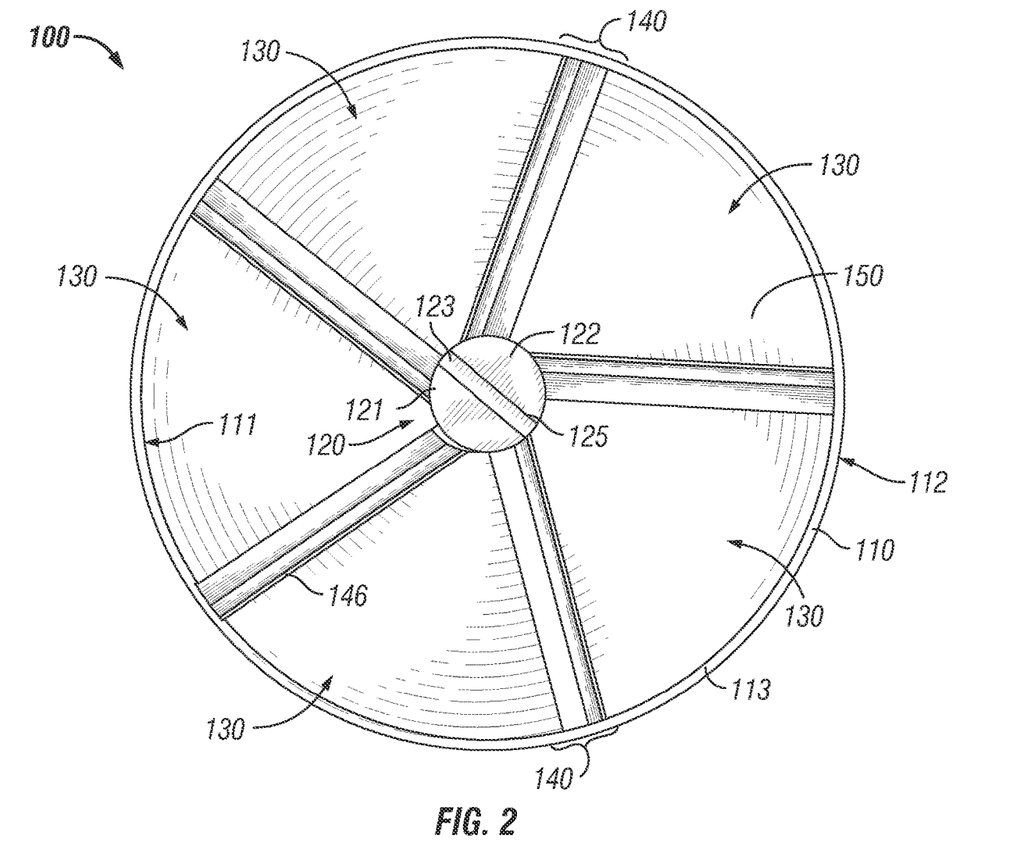
FIG. 2 shows an inlet view of the swirl tube of FIG. 1.

FIG. 2 shows a front view of the swirl tube 100. As shown, the vanes 130 are equally spaced around the perimeter 125 of the central hub 120. The top edge 146 of each vane 130 is offset from the center of the swirl tube 100, which is the centerline 124 of the central hub 120. Specifically, the vanes 130 are configured so that the top edge 146 forms a forward secant line with respect to the centerline 124 of the central hub 120 and a direction of spin induced by the plurality of vanes 130. A fluid flow would enter the swirl tube 100 having a high axial velocity and the vanes 130 direct the airflow to have a high radial velocity with respect to the swirl tube 100.

Figure 3:
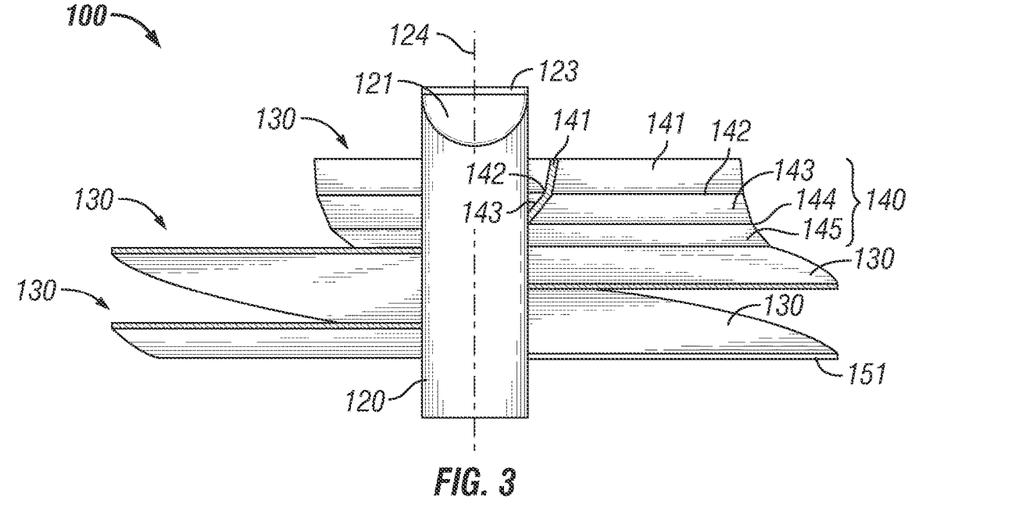
FIG. 3 shows a cross-section view of the swirl tube of FIG. 1 with the outer housing removed for clarity.
Figure 4:
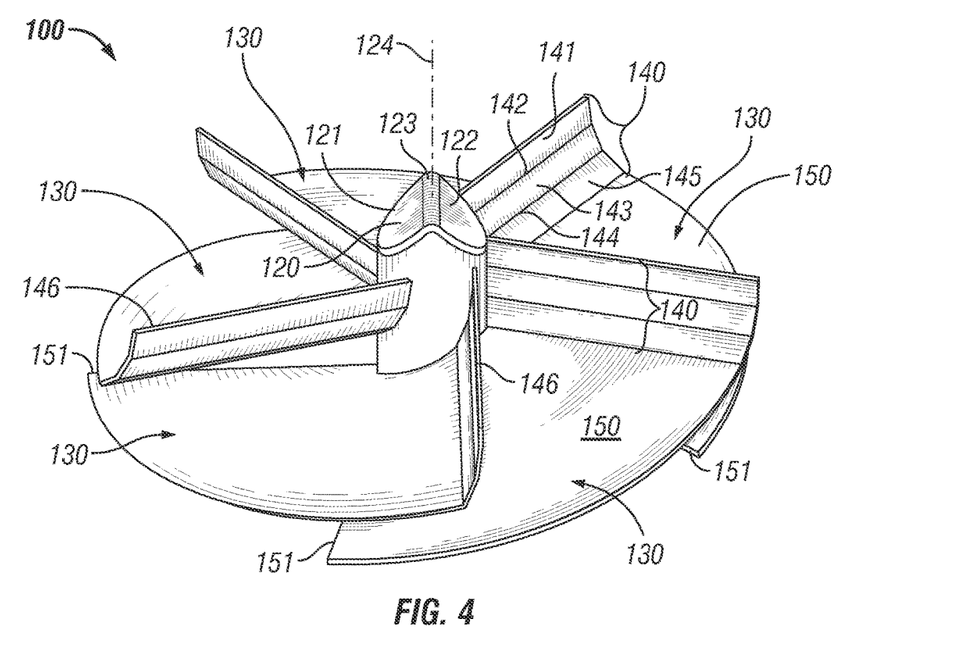
FIG. 4 shows a perspective view of the swirl tube of FIG. 1 with the outer housing removed for clarity.
Figure 5:
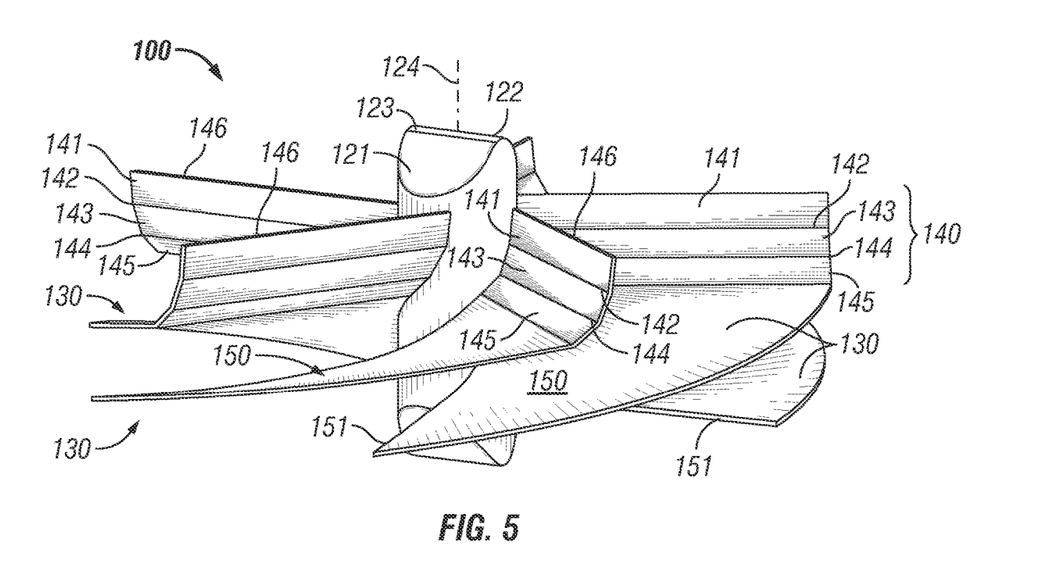
FIG. 5 shows a side view of the swirl tube of FIG. 1 with the outer housing removed for clarity.

FIG. 3 shows a cross-section view of the swirl tube 100 with the outer housing 110 removed for clarity. As shown in FIG. 3, the discharge portion 150 of the vanes 130 is forms substantially a straight line from the central hub 120 to the outer housing 110 (not shown). Thus, the inner fluid flowing through the swirl tube 100 (i.e. the fluid adjacent to the central hub 120) has to travel approximately the same distance as the outer fluid flowing through the swirl tube 100 (i.e. the fluid adjacent to the outer housing 110) to transition to its swirl flow. FIG. 4 shows an isometric view of the swirl tube 100 with the outer housing 110 removed for clarity. FIG. 5 shows a side view of the swirl tube 100 with the outer housing 110 removed for clarity.

The performance of a swirl tube 100 having a forward secant design differs to the performance of a swirl tube with the vanes aligned with the center point of the swirl tube and swirl tubes that have the vanes in a backward secant configuration. One reason for the difference in performance is due to the inlet geometry of the forward secant swirl tube 100 no longer changes with respect to the distance from the centerline 124 of the swirl tube 100. Thus, the fluids near the center of the swirl tube 100 have to travel approximately the same distance to transition from the axial flow to the swirl flow as do the fluids near the outer housing 110. This results in an increased pressure drop of approximately 30%, which may not be suitable for some applications. While the forward secant design of the swirl tube 100 results in an increased pressure drop, the transition to swirl flow may be accomplished in a shorter axial distance than prior swirl tubes, which may be beneficial in some applications where space is at a premium.

Figure 6:
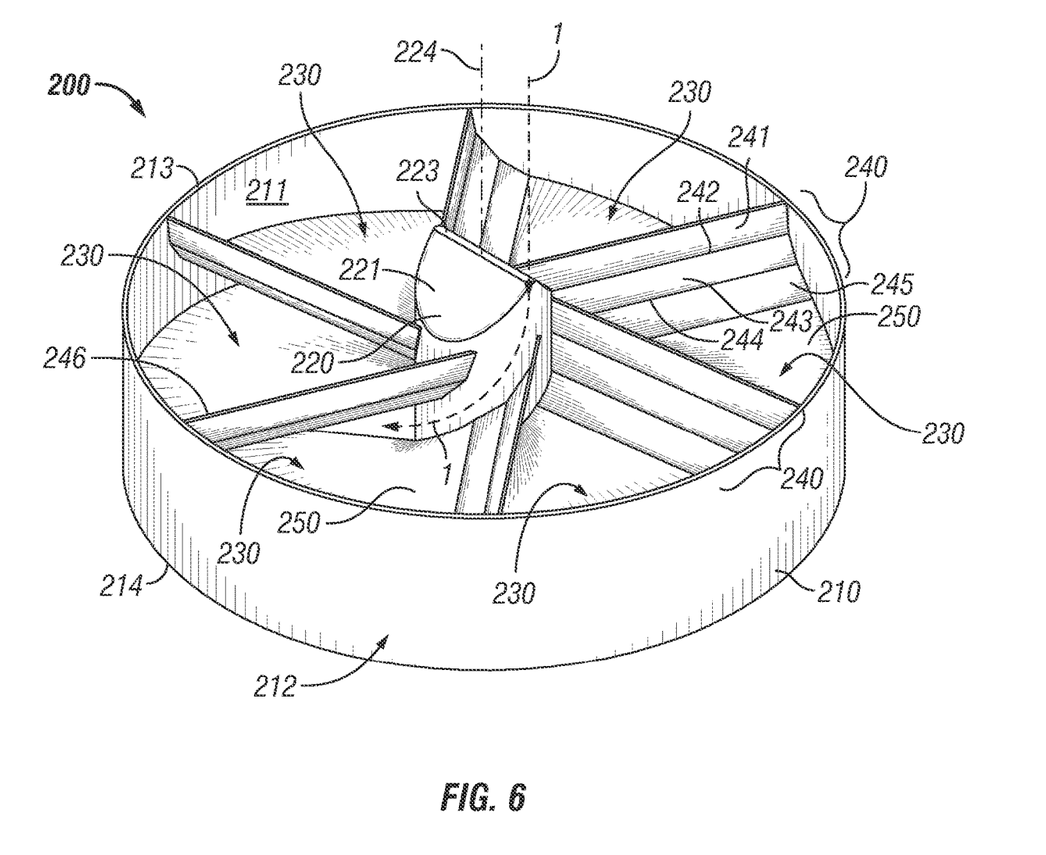
FIG. 6 shows a perspective view of an embodiment of a swirl tube.

FIG. 6 shows a perspective view of an embodiment of a swirl tube 200. The swirl tube 200 include a central hub 220, and outer housing 210, and six vanes 230 that extend between the central hub 220 and the outer housing 210. The outer housing 210 is a circular wall that extends from an inlet edge 213 to an outlet edge 214. The outer housing 210 has an inner surface 211 and an outer surface 212. The swirl tube 200 may have an inner diameter of twenty-four (24) inches.

The central hub 220 has a circular perimeter 225 (best shown in FIG. 7) with the vanes 230 equally spaced around the perimeter 225. The top portion of the central hub 220 includes a first face 221 and a second face 222 with a bend 223 between the first and second faces 221, 222. The central hub 220 has a centerline 224, which is the center point of the swirl tube 200. The top portion of the central hub 220 is configured to be more aerodynamic that as flat faced top. The configuration of the top portion of the central hub 220 is shown for illustrative purposes and may be varied depending on the application as would be appreciated by one of ordinary skill in the art having the benefit of this disclosure.

The vanes 230 are configured to cause airflow through the vanes 230 to swirl to use centripetal acceleration to remove heavier particles, such as water and oil droplets and vapor, from the air flow. The vanes 230 includes inlet transition portion 240 connected to a discharge portion 250. The inlet transition portion 240 includes a top edge 246 of the vane 230 and the discharge portion 250 includes a bottom edge 251 of the vane 230. The top edge 246 of each vane 230 is offset from the centerline 224 of the central hub 220. Specifically, the vanes 230 are configured so that the top edge 246 forms a forward secant line with respect to the centerline 224 of the central hub 220 and a direction of spin (indicated by arrows 1) induced by the plurality of vanes 230.

Figure 7:
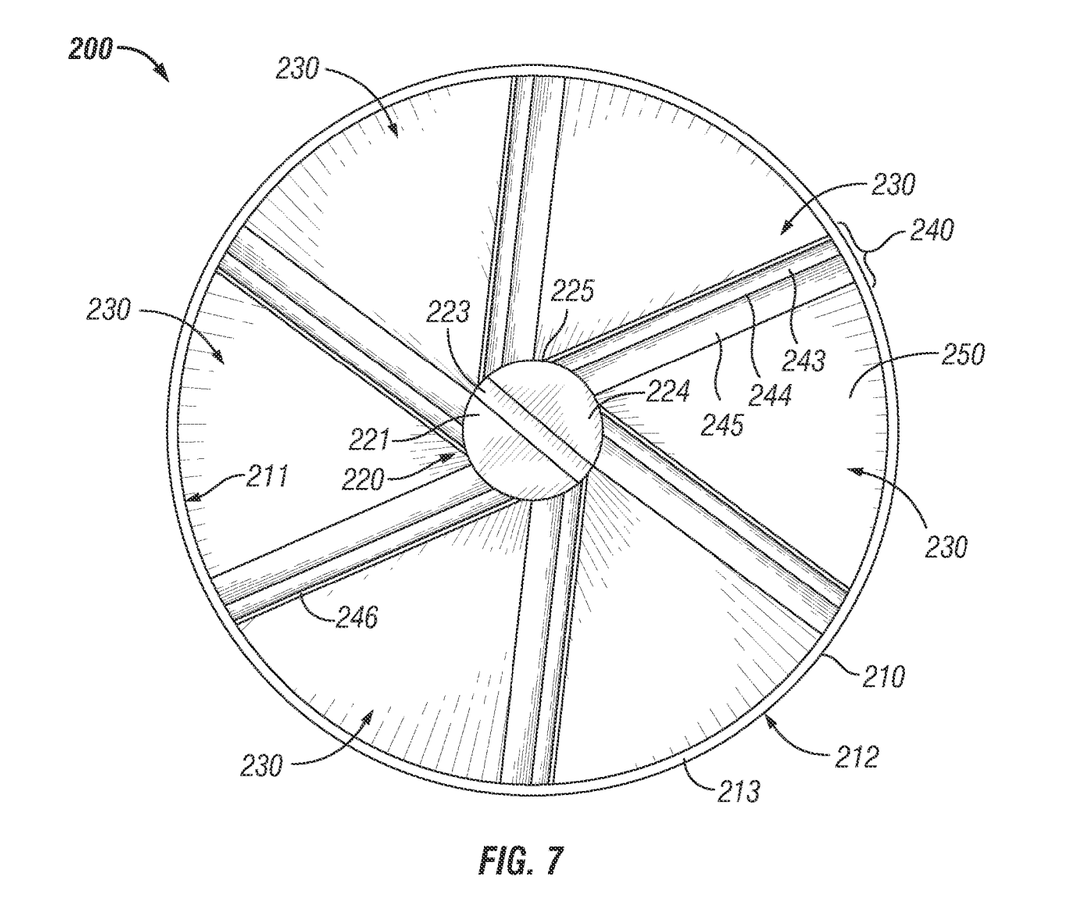
FIG. 7 shows an inlet view of the swirl tube of FIG. 6.

The inlet portion 240 includes an upper portion 241, a middle portion 243, a lower portion 245, a first bend 242 at a first interface between the upper portion 241 and the middle portion 243, and a final bend 244 at a second interface between the middle portion 243 and the lower portion 245 with the lower portion 245 of the inlet transition portion 240 being connected to the discharge portion 250. Specifically, the upper portion 241, middle portion 243, and lower portion 245 of each vane 230 may comprise a face that extends from the central hub 220 to the outer housing 210. The face of the upper portion 241 of the inlet transition portion 240 of each vane is oriented at a first angle with respect to a plane along the outlet edge 214 of the outer housing 210. The face of the middle portion 243 of the inlet transition portion 240 of each vane is oriented at a second angle with respect to the plane along the outlet edge 214 of the outer housing 210. The face of the lower portion 245 of the inlet transition portion 240 of each vane is oriented at a final angle with respect to the plane along the outlet edge 214 of the outer housing 210. The first angle is greater than the second angle and the second angle is greater than the final angle. The inlet transition portion 240 allows the discharge portion 250 of the vanes 230 to have a constant incline or straight section. The geometry of the discharge portion 250 may be formed by simply stamping sheet metal using an auger flight press. The different portions 241, 243, 245 of the inlet transition portion 240 may be formed with a press brake. These portions could take on a different number and angles may be varied depending on the application as would be appreciated by one of ordinary skill in the art having the benefit of this disclosure FIG. 7 shows a front view of the swirl tube 200. As shown, the vanes 230 are equally spaced around the perimeter 225 of the central hub 220. The top edge 246 of each vane 230 is offset from the center of the swirl tube 200, which is the centerline 224 of the central hub 220. Specifically, the vanes 230 are configured so that the top edge 246 forms a forward secant line with respect to the centerline 224 of the central hub 220 and a direction of spin induced by the plurality of vanes 230. As flow of fluid enters the swirl tube 200 having a high axial velocity, the vanes 230 direct the airflow to have a high radial velocity with respect to the swirl tube 200.

Figure 8:
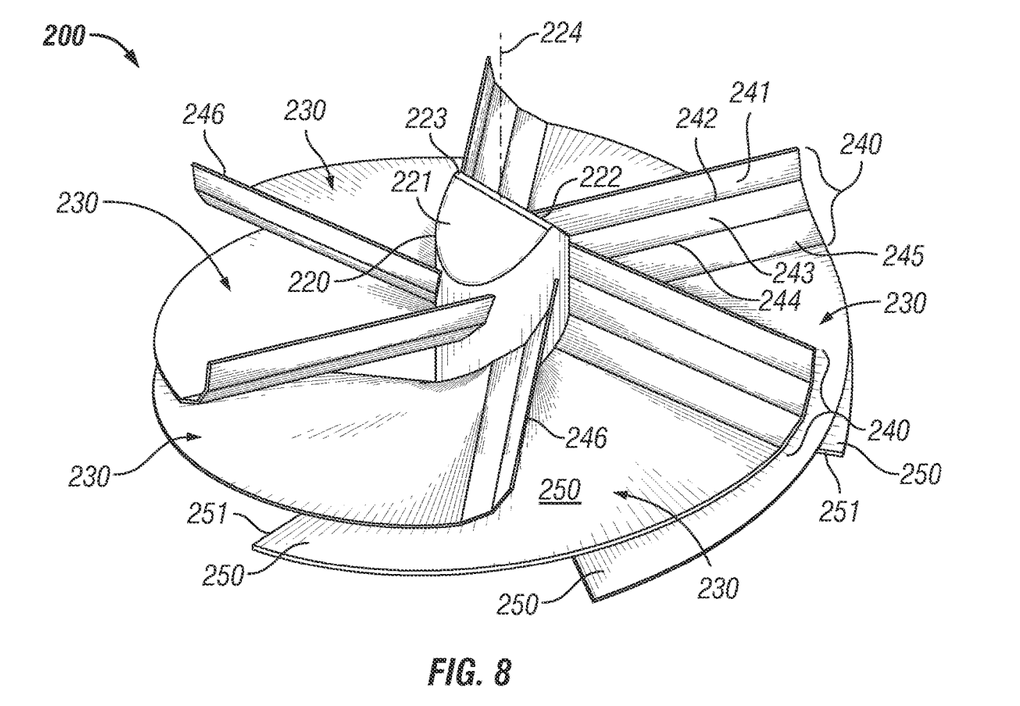
FIG. 8 shows a perspective view of the swirl tube of FIG. 6 with the outer housing removed for clarity.
Figure 9:
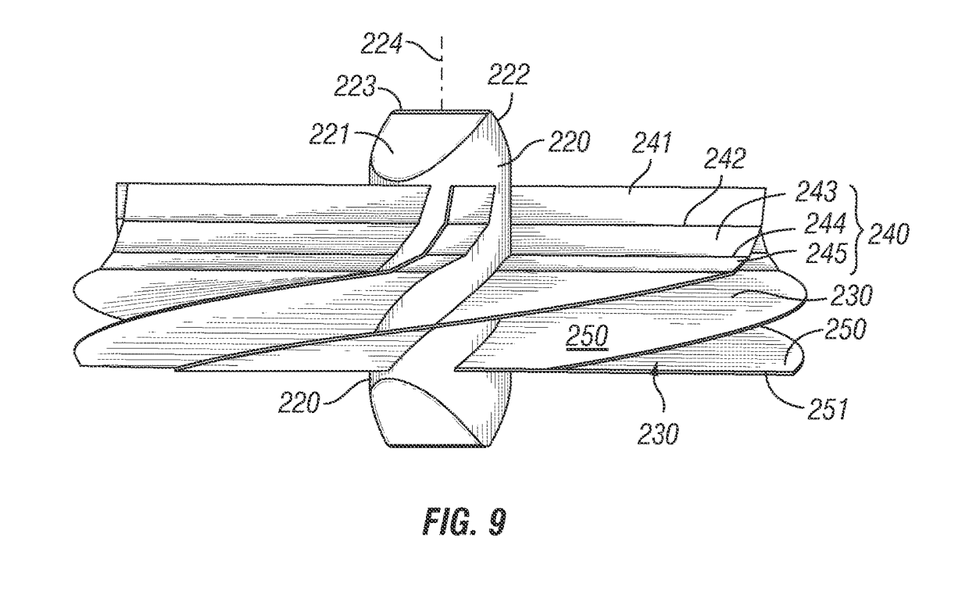
FIG. 9 shows a side view of the swirl tube of FIG. 6 with the outer housing removed for clarity.

FIG. 8 shows an isometric view of the swirl tube 200 with the outer housing 210 removed for clarity. FIG. 9 shows a side view of the swirl tube 200 with the outer housing 210 removed for clarity.

As discussed herein, the performance of a swirl tube 200 having a forward secant design differs to the performance of a swirl tube with the vanes aligned with the center point of the swirl tube and swirl tubes that have the vanes in a backward secant configuration. One reason for the difference in performance is due to the inlet geometry of the forward secant swirl tube 200 no longer changes with respect to the distance from the centerline 224 of the swirl tube 200. Thus, the fluids near the center of the swirl tube 200 have to travel approximately the same distance to transition from the axial flow to the swirl flow as do the fluids near the outer housing 210. This results in an increased pressure drop of approximately 30%, which may not be suitable for some applications. While the forward secant design of the swirl tube 200 results in an increased pressure drop, the transition to swirl flow may be accomplished in a shorter axial distance than prior swirl tubes, which may be beneficial in some applications where space is at a premium.

Figure 10:
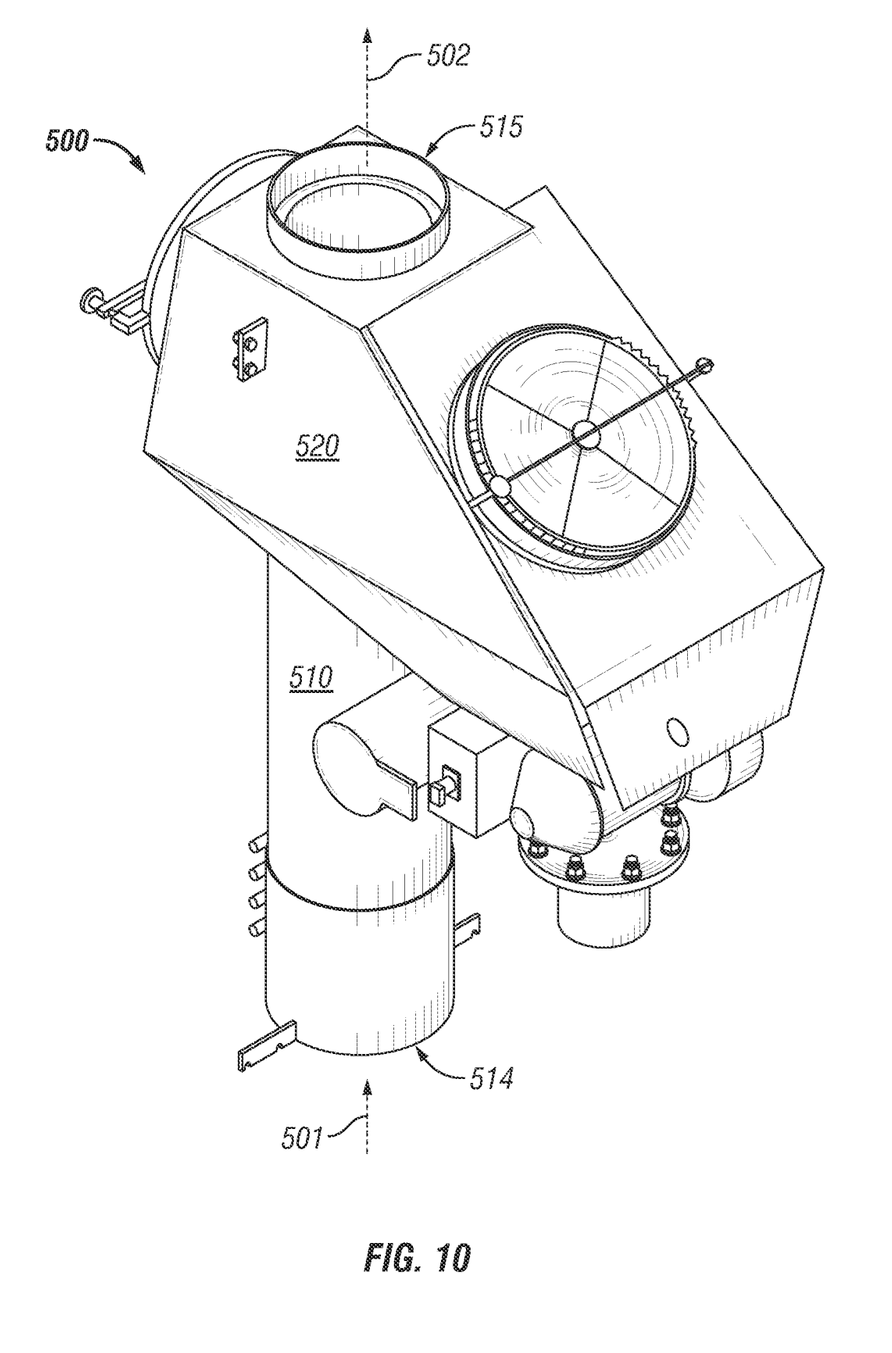
FIG. 10 shows a perspective view of an embodiment of a system that utilizes a swirl tube.
Figure 11:
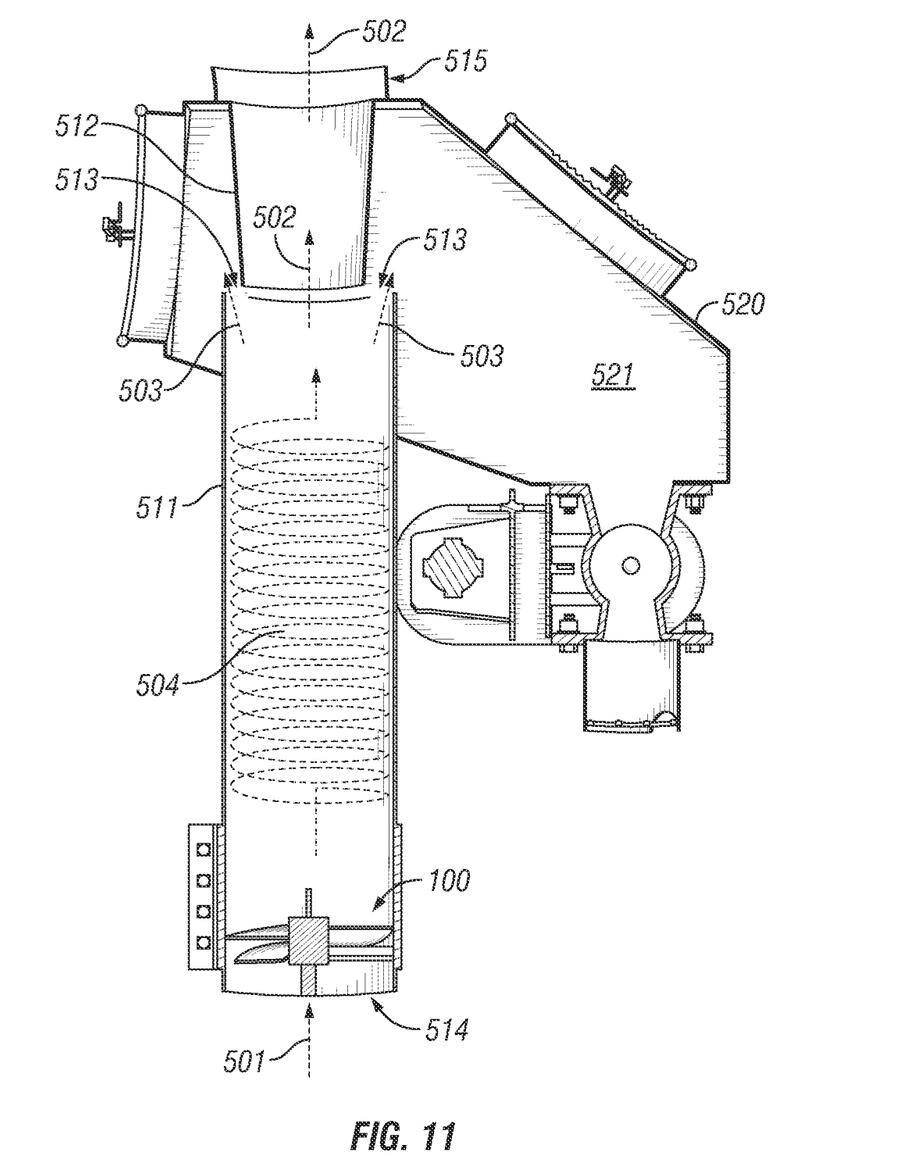
FIG. 11 shows a cross-section view of an embodiment of the system of FIG. 10 that utilizes a swirl tube.
Figure 12:
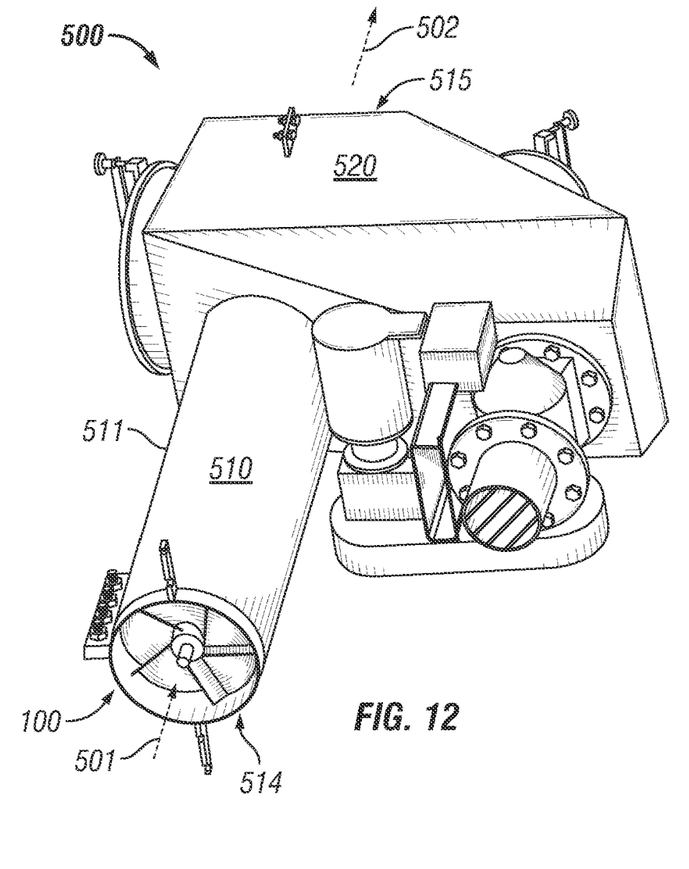
FIG. 12 shows a bottom perspective view of the embodiment of the system of FIG. 10 that utilizes a swirl tube.

FIG. 10 shows a perspective view of a system 500 that utilizes a swirl tube 100 (best shown in FIGS. 11 and 12). FIG. 11 shows a cross-section view of the system 500 and FIG. 12 shows a rear perspective view of the system 500. The swirl tube 200 of FIGS. 6-9 may be used in a similar system as would be appreciated by one of ordinary skill in the art having the benefit of this disclosure. A gas or air flow enters a flow tube 510 of the system 500 as indicated by arrow 501. A swirl tube 100 is positioned within the flow tube 510. The swirl tube 100 causes the air flow to swirl within the flow tube 510 as discussed herein. The swirling of the air flow causes the heavy particles (e.g., water and/or oil droplets) within the air flow to move towards that outer diameter of the air flow. A collection housing 520 is connected to the flow tube 510. The collection housing 520 includes an inner chamber 521 as shown in FIG. 11.

As shown in FIG. 11, the flow tube 510 includes an outer housing 511 and an upper inner housing 512. The outer diameter of the inner housing 512 is smaller than the inner diameter of the outer housing creating openings 513. The openings 513 open into the inner chamber 521 of the collection housing 520. As air travels from inlet 514 into the flow tube 510 it swirls, as shown by curved arrow 504. As the air flow reaches the inner housing 512, the outer portion of the air flow enters the inner chamber 521 of the collection housing 520 as indicated by arrows 503 with the central portion of the air flow flowing out through the inner housing 512 as indicated by arrow 502.

As discussed herein, particles within the air flow, such as water and oil droplets and vapor, will move to the outer portion of the air flow due to the swirl flow created by the swirl tube 100. The water and oil droplets will enter into the inner cavity 521 of the collection chamber 520 via openings 513. The system 500 may be used to remove undesired particles from an air flow as would be appreciated by one of ordinary skill in the art having the benefit of this disclosure.

FIG. 12 shows components that may be used to remove collected fluid, oil, and other particles from the inner chamber 521 of the collection housing 520. The collection housing 520 includes a rotary valve, also referred to as a star valve, that enables collected fluid, oil, and other particles to be removed from the inner chamber 521. The rotary valve may be replaced with other devices such as an airlock type device or check valve that ensures air is not pulled into the system reducing the velocity of air at the swirl vanes.

Figure 13:
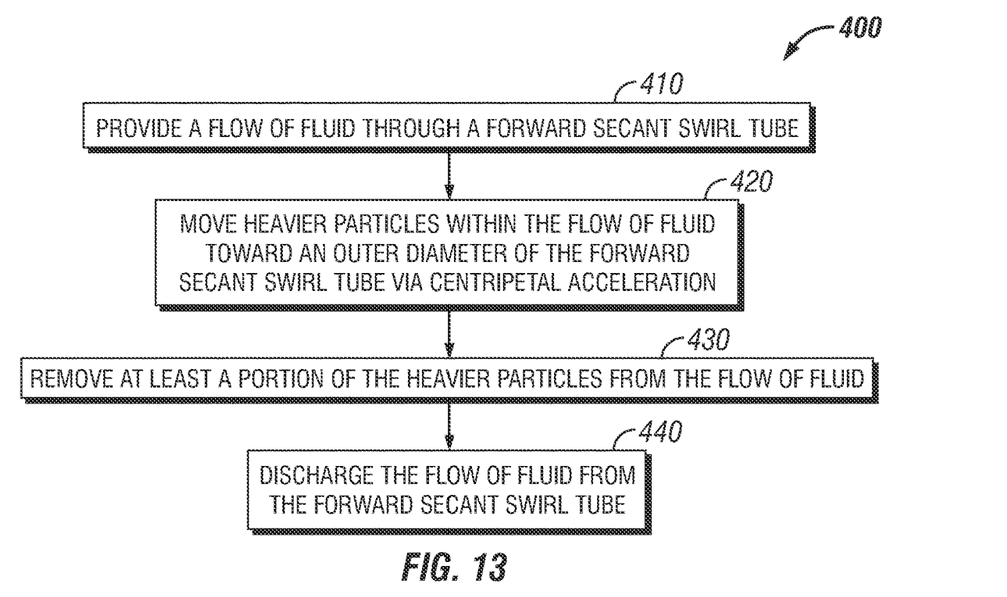
FIG. 13 is a flow chart of an embodiment of a method of the disclosure.

FIG. 13 is a flow chart of a method 400 of the present disclosure. The method 400 includes providing a flow of fluid through a forward secant swirl tube, at 410. The method 400 includes moving heaving particles within the flow of fluid toward an outer diameter of the forward secant swirl tube via centripetal acceleration, at 420. The method 400 includes removing at least a portion of the heavier particles form the flow of fluid, at 430. The method 400 includes discharging the flow of fluid from the forward secant swirl tube, at 440.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A method comprising:
providing a flow of fluid through a forward secant swirl tube;
moving heavier particles within the flow of fluid toward an outer diameter of the forward secant swirl tube via centripetal acceleration;
removing at least a portion of the heavier particles from the flow of fluid;
discharging the flow of fluid from the forward secant swirl tube
wherein the forward secant swirl tube comprises:
a central hub having a centerline and a circular perimeter;
an outer housing, the outer housing comprising a circular wall that extends from an inlet edge to an outlet edge;
a plurality of vanes that extend from the central hub to the outer housing, the plurality of vanes equally spaced around the circular perimeter of the central hub, each vane of the plurality of vanes having an inlet transition portion connected to a discharge portion, the inlet transition portion having a top edge and the discharge portion having a bottom edge;

wherein the top edge of the inlet transition portion of each vane of the plurality of vanes is offset from the centerline of the central hub and the top edge forms a forward secant line with respect to the centerline of the central hub and a direction of spin induced by the plurality of vanes; and wherein the discharge portion of each vane of the plurality of vanes has a constant incline along a line normal to the centerline of the central hub.

2. The method of claim 1, wherein the heavier particles comprises at least one of moisture particles, oil particles, and vapor.

3. The method of claim 1, wherein the inlet transition portion of each vane of the plurality of vanes comprises a plurality of faces formed by a press brake.

4. The method of claim 1, wherein the inlet transition portion of each vane of the plurality of vanes comprises an upper portion, a middle portion, a lower portion, a first bend at a first interface between the upper portion and the middle portion, and a final bend at a second interface between the middle portion and the lower portion, wherein the lower portion of the inlet transition portion is connected to the discharge portion.

5. The method of claim 4, wherein the upper portion, middle portion, and lower portion of each vane of the plurality of vanes comprises a face, wherein the face of the upper portion of the inlet transition portion of each vane of the plurality of vanes is oriented at a first angle with respect to a plane along the outlet edge of the outer housing, wherein the face of the middle portion of the inlet transition portion of each vane of the plurality of vanes is oriented at a second angle with respect to the plane along the outlet edge of the outer housing, and wherein the face of the upper portion of the inlet transition portion of each vane of the plurality of vanes is oriented at a final angle with respect to the plane along the outlet edge of the outer housing, the first angle being greater than the second angle and the second angle being greater than the final angle.

6. The method of claim 4, wherein the central hub comprises a top surface, the top surface comprises a first face, a second face, and an interface between the first face and the second face, wherein the first face extends downward toward the plurality of vanes from the interface and wherein the second face extends downward toward the plurality of vanes from the interface.

7. The method of claim 1, wherein providing a flow of fluid through a forward secant swirl tube further comprising providing the flow of fluid through the forward secant swirl tube in a direction that is upwards with respect to gravity.

8. The method of claim 1, wherein the forward secant swirl tube is comprised of stainless steel.

9. The method of claim 1, wherein removing at least a portion of the heavier particles from the flow of fluid further comprises collecting the heavier particles in an inner chamber of a collection housing.

10. The method of claim 9, further comprising removing the heavier particles from the inner chamber of the collection housing.

11. The method of claim 10, wherein the heavier particles are removed from the inner chamber of the collection housing via a rotary valve, an airlock type device, or a check valve.

12. A method comprising:
providing a flow of fluid through a forward secant swirl tube;
moving heavier particles within the flow of fluid toward an outer diameter of the forward secant swirl tube via centripetal acceleration;
removing at least a portion of the heavier particles from the flow of fluid;
discharging the flow of fluid from the forward secant swirl tube;
wherein the forward secant swirl tube comprises:
a central hub having a centerline and a circular perimeter;
an outer housing, the outer housing comprising a circular wall that extends from an inlet edge to an outlet edge;
a plurality of vanes that extend from the central hub to the outer housing, the plurality of vanes equally spaced around the circular perimeter of the central hub, each vane of the plurality of vanes having an inlet transition portion connected to a discharge portion, the inlet transition portion having a top edge and the discharge portion having a bottom edge;
wherein the top edge of the inlet transition portion of each vane of the plurality of vanes is offset from the centerline of the central hub and the top edge forms a forward secant line with respect to the centerline of the central hub and a direction of spin induced by the plurality of vanes; and
wherein the central hub comprises a top surface, the top surface comprises a first face, a second face, and an interface between the first face and the second face, wherein the first face extends downward toward the plurality of vanes from the interface and wherein the second face extends downward toward the plurality of vanes from the interface.

13. The method of claim 12, wherein the discharge portion of each vane of the plurality of vanes has a constant incline along a line normal to the centerline of the central hub.

14. The method of claim 12, wherein the inlet transition portion of each vane of the plurality of vanes comprises an upper portion, a middle portion, a lower portion, a first bend at a first interface between the upper portion and the middle portion, and a final bend at a second interface between the middle portion and the lower portion, wherein the lower portion of the inlet transition portion is connected to the discharge portion.

15. The method of claim 14, wherein the upper portion, middle portion, and lower portion of each vane of the plurality of vanes comprises a face, wherein the face of the upper portion of the inlet transition portion of each vane of the plurality of vanes is oriented at a first angle with respect to a plane along the outlet edge of the outer housing, wherein the face of the middle portion of the inlet transition portion of each vane of the plurality of vanes is oriented at a second angle with respect to the plane along the outlet edge of the outer housing, and wherein the face of the upper portion of the inlet transition portion of each vane of the plurality of vanes is oriented at a final angle with respect to the plane along the outlet edge of the outer housing, the first angle being greater than the second angle and the second angle being greater than the final angle.

16. The method of claim 15, wherein the discharge portion of each vane of the plurality of vanes has a constant incline along a line normal to the centerline of the central hub.

17. The method of claim 12, wherein removing at least a portion of the heavier particles from the flow of fluid further comprises collecting the heavier particles in an inner chamber of a collection housing.

18. The method of claim 17, further comprising removing the heavier particles from the inner chamber of the collection housing.

\* \* \* \* \*